United States Patent
Zhou et al.

(10) Patent No.: US 12,369,192 B2
(45) Date of Patent: Jul. 22, 2025

(54) SELECTIVE RESOURCE COLLISION INDICATION ACCORDING TO FULL DUPLEX COMMUNICATION CAPABILITY

(71) Applicant: QUALCOMM Incorporated, San Diego, CA (US)

(72) Inventors: Yan Zhou, San Diego, CA (US); Qian Zhang, Basking Ridge, NJ (US); Sony Akkarakaran, Poway, CA (US); Navid Abedini, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 17/450,637

(22) Filed: Oct. 12, 2021

(65) Prior Publication Data

US 2023/0114809 A1    Apr. 13, 2023

(51) Int. Cl.
| | |
|---|---|
| *H04L 5/14* | (2006.01) |
| *H04J 3/26* | (2006.01) |
| *H04W 8/24* | (2009.01) |
| *H04W 72/02* | (2009.01) |
| *H04W 72/566* | (2023.01) |
| *H04W 74/0816* | (2024.01) |
| *H04W 84/12* | (2009.01) |
| *H04W 92/18* | (2009.01) |

(52) U.S. Cl.
CPC .......... *H04W 74/0816* (2013.01); *H04L 5/14* (2013.01); *H04W 8/24* (2013.01); *H04W 92/18* (2013.01)

(58) Field of Classification Search
CPC ....... H04W 72/21; H04W 72/23; H04W 4/46; H04W 72/04; H04W 4/40; H04W 72/0446; H04W 72/046; H04W 72/20; H04W 74/0816; H04W 72/02; H04L 5/16; H04L 5/14; H04L 5/0035; H04B 7/088
USPC .................................................. 370/329, 278
See application file for complete search history.

(56) References Cited

U.S. PATENT DOCUMENTS

| | | | |
|---|---|---|---|
| 10,333,686 B2 * | 6/2019 | Tabet ........................ H04L 5/14 |
| 2016/0242072 A1 * | 8/2016 | Hsu ...................... H04W 28/06 |
| 2017/0033916 A1 * | 2/2017 | Stirling-Gallacher ...................... H04W 72/0446 |
| 2017/0034837 A1 * | 2/2017 | Lopez-Perez ....... H04W 72/541 |
| 2017/0195991 A1 * | 7/2017 | Ahn ...................... H04W 72/30 |
| 2018/0103456 A1 * | 4/2018 | Zhao ...................... H04W 48/04 |
| 2019/0261409 A1 * | 8/2019 | Chen ................. H04W 72/1263 |
| 2020/0274686 A1 * | 8/2020 | Khude .............. H04W 74/0816 |
| 2021/0105789 A1 * | 4/2021 | Freda .................. H04W 72/543 |
| 2022/0053460 A1 * | 2/2022 | Yu ........................ H04W 76/28 |
| 2022/0190971 A1 * | 6/2022 | Zhang ..................... H04W 4/70 |

(Continued)

*Primary Examiner* — Marcus Smith
*Assistant Examiner* — Jason A Harley
(74) *Attorney, Agent, or Firm* — Harrity & Harrity, LLP \ Qualcomm

(57) ABSTRACT

Various aspects of the present disclosure generally relate to wireless communication. In some aspects, a user equipment (UE) may receive at least one of first information relating to a full duplex communication capability of a different UE or second information relating to resources allocated for a simultaneous transmission and reception for the different UE. The UE may selectively transmit an indication of a resource collision for the simultaneous transmission and reception for the different UE based at least in part on the at least one of the first information or the second information. Numerous other aspects are described.

30 Claims, 11 Drawing Sheets

(56) References Cited

U.S. PATENT DOCUMENTS

| | | | |
|---|---|---|---|
| 2023/0141004 A1* | 5/2023 | Hong | H04W 72/02 370/311 |
| 2023/0164825 A1* | 5/2023 | Deng | H04W 72/02 370/329 |
| 2024/0147514 A1* | 5/2024 | Yao | H04L 1/20 |

* cited by examiner

SELECTIVE RESOURCE COLLISION INDICATION ACCORDING TO FULL DUPLEX COMMUNICATION CAPABILITY

FIELD OF THE DISCLOSURE

Aspects of the present disclosure generally relate to wireless communication and to techniques and apparatuses for selective resource collision indication according to full duplex communication capability.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by an apparatus of a user equipment (UE). The method may include receiving at least one of first information relating to a full duplex communication capability of a different UE or second information relating to resources allocated for a simultaneous transmission and reception for the different UE. The method may include selectively transmitting an indication of a resource collision for the simultaneous transmission and reception for the different UE based at least in part on the at least one of the first information or the second information.

Some aspects described herein relate to a method of wireless communication performed by an apparatus of a UE. The method may include transmitting at least one of first information relating to a full duplex communication capability of the UE or second information relating to resources allocated for a simultaneous transmission and reception for the UE. The method may include selectively receiving an indication of a resource collision for the simultaneous transmission and reception for the UE based at least in part on the at least one of the first information or the second information.

Some aspects described herein relate to a method of wireless communication performed by an apparatus of a UE. The method may include transmitting at least one of first information relating to a full duplex communication capability of a different UE or second information relating to resources allocated for a simultaneous transmission and reception for the different UE. The method may include selectively receiving an indication of a resource collision for the simultaneous transmission and reception for the different UE based at least in part on the at least one of the first information or the second information.

Some aspects described herein relate to an apparatus for wireless communication at a UE. The apparatus may include a memory and one or more processors coupled to the memory. The one or more processors may be configured to receive at least one of first information relating to a full duplex communication capability of a different UE or second information relating to resources allocated for a simultaneous transmission and reception for the different UE. The one or more processors may be configured to selectively transmit an indication of a resource collision for the simultaneous transmission and reception for the different UE based at least in part on the at least one of the first information or the second information.

Some aspects described herein relate to an apparatus for wireless communication at a UE. The apparatus may include a memory and one or more processors coupled to the memory. The one or more processors may be configured to transmit at least one of first information relating to a full duplex communication capability of the UE or second information relating to resources allocated for a simultaneous transmission and reception for the UE. The one or more processors may be configured to selectively receive an indication of a resource collision for the simultaneous transmission and reception for the UE based at least in part on the at least one of the first information or the second information.

Some aspects described herein relate to an apparatus for wireless communication at a UE. The apparatus may include a memory and one or more processors coupled to the memory. The one or more processors may be configured to transmit at least one of first information relating to a full duplex communication capability of a different UE or second information relating to resources allocated for a simultaneous transmission and reception for the different UE. The one or more processors may be configured to selectively receive an indication of a resource collision for the simultaneous transmission and reception for the different UE based at least in part on the at least one of the first information or the second information.

Some aspects described herein relate to a non-transitory computer-readable medium that stores a set of instructions for wireless communication by a UE. The set of instructions, when executed by one or more processors of the UE, may cause the UE to receive at least one of first information relating to a full duplex communication capability of a different UE or second information relating to resources allocated for a simultaneous transmission and reception for the different UE. The set of instructions, when executed by one or more processors of the UE, may cause the UE to selectively transmit an indication of a resource collision for the simultaneous transmission and reception for the different UE based at least in part on the at least one of the first information or the second information.

Some aspects described herein relate to a non-transitory computer-readable medium that stores a set of instructions for wireless communication by a UE. The set of instructions, when executed by one or more processors of the UE, may cause the UE to transmit at least one of first information relating to a full duplex communication capability of the UE or second information relating to resources allocated for a simultaneous transmission and reception for the UE. The set of instructions, when executed by one or more processors of the UE, may cause the UE to selectively receive an indication of a resource collision for the simultaneous transmission and reception for the UE based at least in part on the at least one of the first information or the second information.

Some aspects described herein relate to a non-transitory computer-readable medium that stores a set of instructions for wireless communication by a UE. The set of instructions, when executed by one or more processors of the UE, may cause the UE to transmit at least one of first information relating to a full duplex communication capability of a different UE or second information relating to resources allocated for a simultaneous transmission and reception for the different UE. The set of instructions, when executed by one or more processors of the UE, may cause the UE to selectively receive an indication of a resource collision for the simultaneous transmission and reception for the different UE based at least in part on the at least one of the first information or the second information.

Some aspects described herein relate to an apparatus for wireless communication. The apparatus may include means for receiving at least one of first information relating to a full duplex communication capability of a UE or second information relating to resources allocated for a simultaneous transmission and reception for the UE. The apparatus may include means for selectively transmitting an indication of a resource collision for the simultaneous transmission and reception for the UE based at least in part on the at least one of the first information or the second information.

Some aspects described herein relate to an apparatus for wireless communication. The apparatus may include means for transmitting at least one of first information relating to a full duplex communication capability of the apparatus or second information relating to resources allocated for a simultaneous transmission and reception for the apparatus. The apparatus may include means for selectively receiving an indication of a resource collision for the simultaneous transmission and reception for the apparatus based at least in part on the at least one of the first information or the second information.

Some aspects described herein relate to an apparatus for wireless communication. The apparatus may include means for transmitting at least one of first information relating to a full duplex communication capability of a UE or second information relating to resources allocated for a simultaneous transmission and reception for the UE. The apparatus may include means for selectively receiving an indication of a resource collision for the simultaneous transmission and reception for the UE based at least in part on the at least one of the first information or the second information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
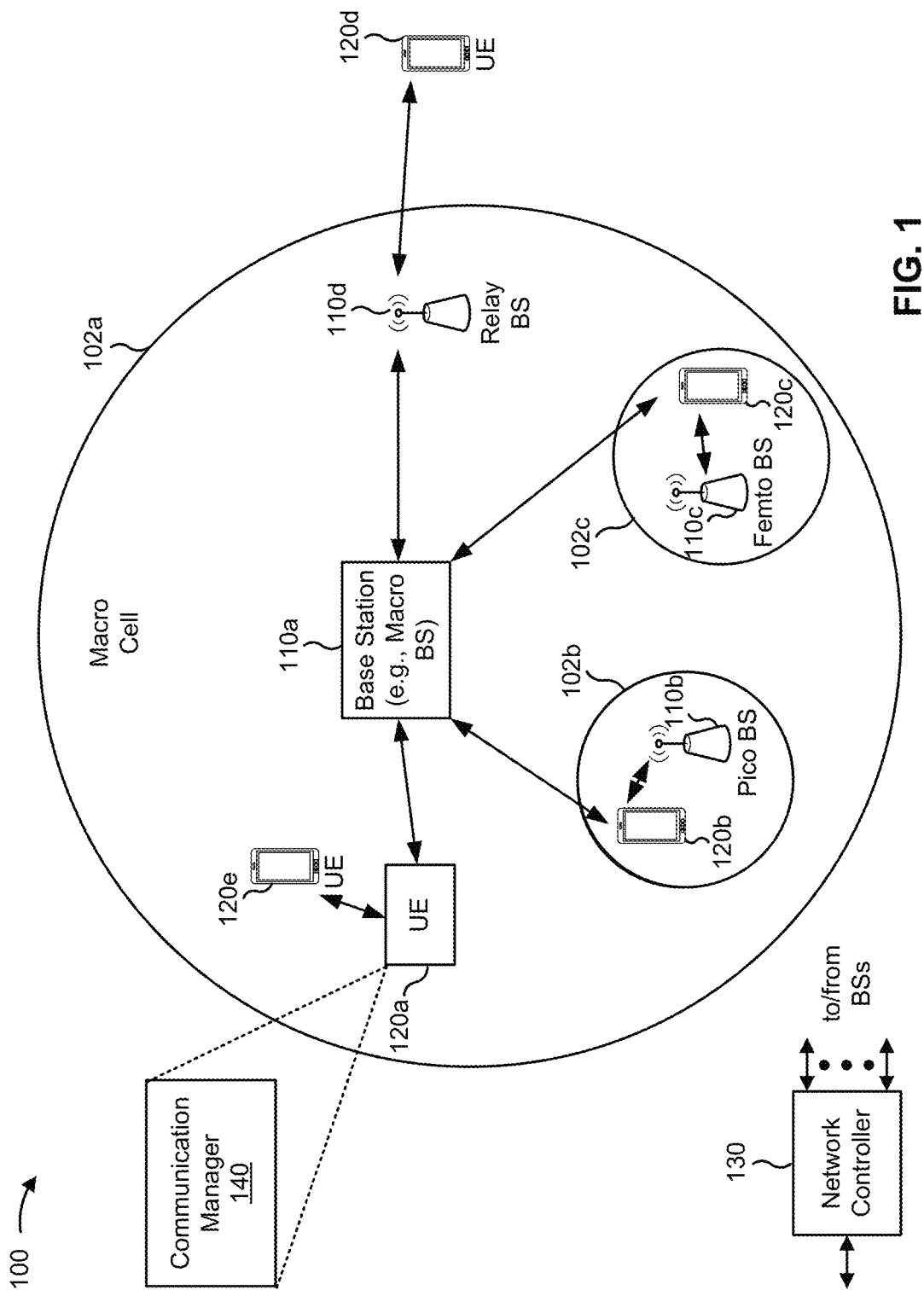
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive at least one of first information relating to a full duplex communication capability of a different UE or second information relating to resources allocated for a simultaneous transmission and reception for the different UE; and selectively transmit an indication of a resource collision for the simultaneous transmission and reception for the different UE based at least in part on the at least one of the first information or the second information. Additionally, or alternatively, the communication manager 140 may transmit at least one of first information relating to a full duplex communication capability of the UE or second information relating to resources allocated for a simultaneous transmission and reception for the UE; and selectively receive an indication of a resource collision for the simultaneous transmission and reception for the UE based at least in part on the at least one of the first information or the second information. Additionally, or alternatively, the communication manager 140 may transmit at least one of first information relating to a full duplex communication capability of a different UE or second information relating to resources allocated for a simultaneous transmission and reception for the different UE; and selectively receive an indication of a resource collision for the simultaneous transmission and reception for the different UE based at least in part on the at least one of the first information or the second information. Additionally, or alternatively, the communication manager 140 may perform one or more other operations described herein.

As indicated above, FIG. 1 is provided as an example. Other examples may differ from what is described with regard to FIG. 1.

Figure 2:
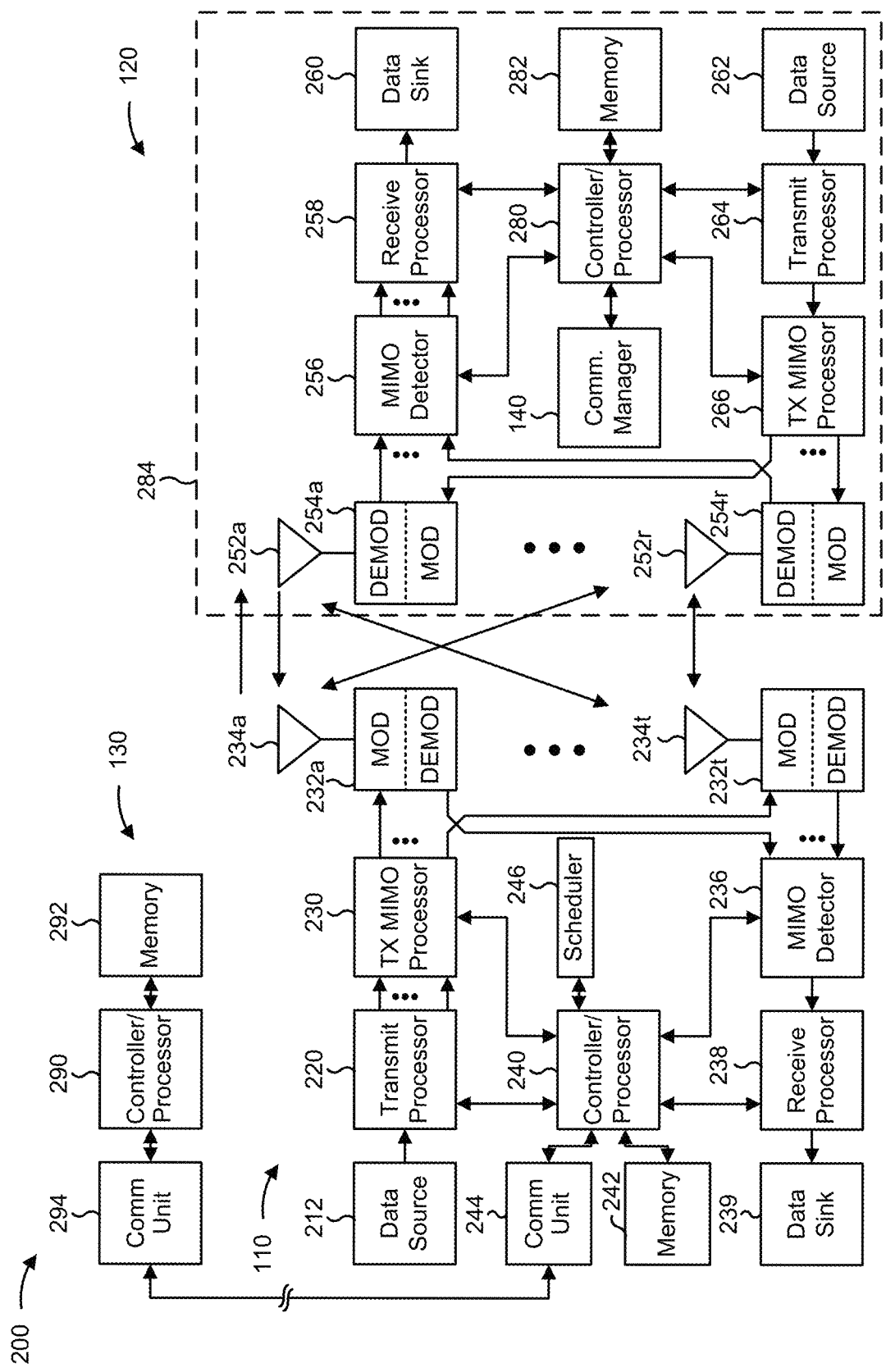
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-11).

The controller/processor 240 of the base station 110, the controller/processor 280 of the UE 120, and/or any other component(s) of FIG. 2 may perform one or more techniques associated with selective resource collision indication according to full duplex communication capability, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE includes means for receiving at least one of first information relating to a full duplex communication capability of a different UE or second information relating to resources allocated for a simultaneous transmission and reception for the different UE; and/or means for selectively transmitting an indication of a resource collision for the simultaneous transmission and reception for the different UE based at least in part on the at least one of the first information or the second information. Additionally, or alternatively, the UE includes means for transmitting at least one of first information relating to a full duplex communication capability of the UE or second information relating to resources allocated for a simultaneous transmission and reception for the UE; and/or means for selectively receiving an indication of a resource collision for the simultaneous transmission and reception for the UE based at least in part on the at least one of the first information or the second information. Additionally, or alternatively, the UE includes means for transmitting at least one of first information relating to a full duplex communication capability of a different UE or second information relating to resources allocated for a simultaneous transmission and reception for the different UE; and/or means for selectively receiving an indication of a resource collision for the simultaneous transmission and reception for the different UE based at least in part on the at least one of the first information or the second information. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
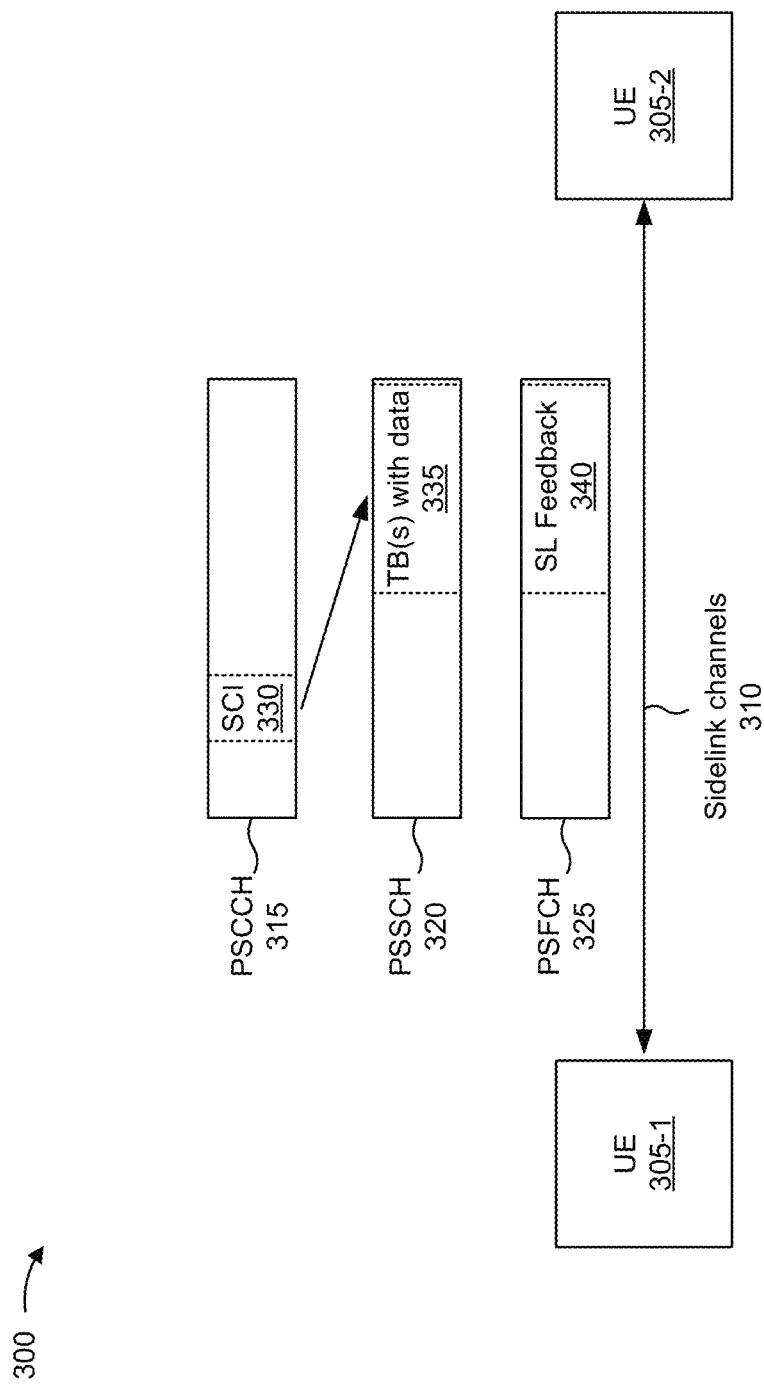
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a hybrid automatic repeat request (HARD) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling. In some aspects, a UE 305 may operate using a transmission mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure a RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
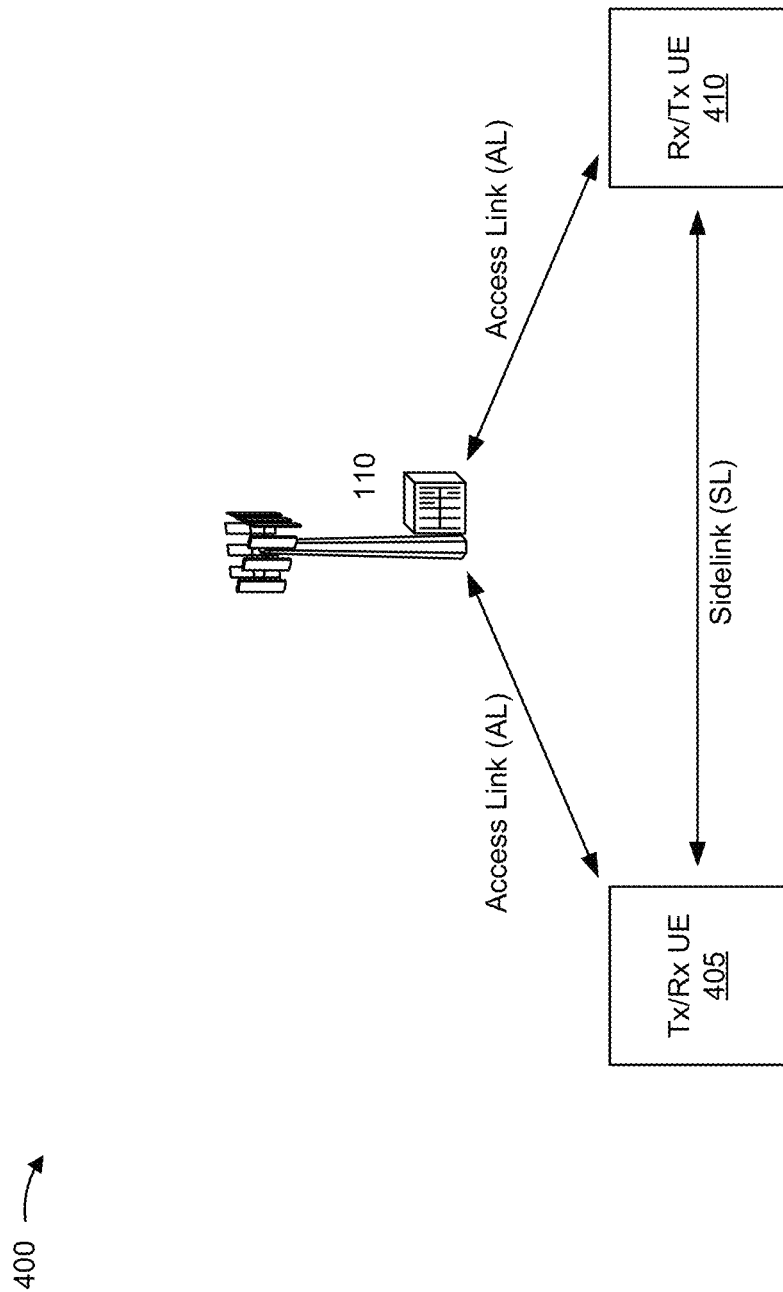
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
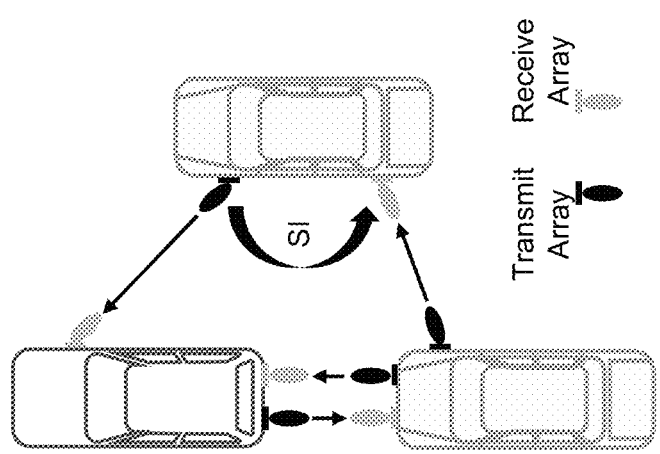
FIG. 5 is a diagram illustrating an example of spatial isolation of antenna panels, in accordance with the present disclosure.

FIG. 5 is a diagram illustrating an example 500 of spatial isolation of antenna panels, in accordance with the present disclosure. Spatial isolation between a transmit antenna panel or array and a receive antenna panel or array may reduce self-interference associated with full duplex communication (e.g., transmission and reception at a device overlapping in time). In V2X, the size of a vehicle or a roadside unit (RSU) may provide enough space to ensure sufficient spatial isolation between a transmit panel/array and a receive panel/array. For example, FIG. 5 shows example placements of transmit panels/arrays and receive panels/arrays on vehicles to reduce self-interference (shown as "SI"). In addition, self-interference may be further reduced by larger beamforming gain provided by increasing the quantity of antenna elements per panel/array (e.g., in FR2, or higher frequencies, which may be referred to as FRx).

As indicated above, FIG. 5 is provided as an example. Other examples may differ from what is described with respect to FIG. 5.

Figure 6:
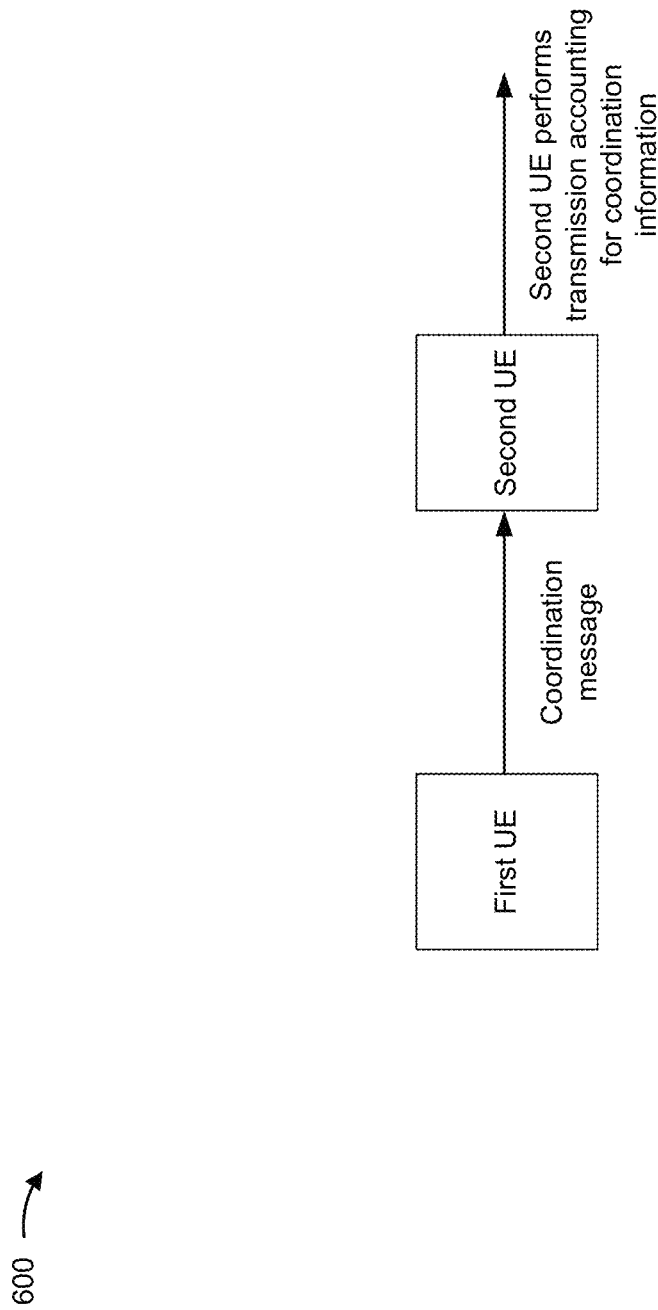
FIG. 6 is a diagram illustrating an example of coordination signaling, in accordance with the present disclosure.

FIG. 6 is a diagram illustrating an example 600 of coordination signaling, in accordance with the present disclosure.

In example 600, a first UE (e.g., UE 120a of FIG. 1) exchanges inter-UE coordination signaling with a second UE (e.g., UE 120e of FIG. 1). The first UE and the second UE may operate in an in-coverage mode, a partial coverage mode, or an out-of-coverage mode with a base station 110. The first UE may determine a set of sidelink resources available for a resource allocation. The first UE may determine the set of sidelink resources based at least in part on determining that the set of sidelink resources are to be selected or based at least in part on a request, referred to herein as an inter-UE coordination request, received from the second UE or a base station 110. In some aspects, the first UE may determine the set of sidelink resources based at least in part on a sensing operation, which may be performed before receiving an inter-UE coordination request or after receiving the inter-UE coordination request.

The first UE may transmit an indication of the set of available resources to the second UE via inter-UE coordination signaling (shown as a coordination message, and referred to in some aspects as an inter-UE coordination message or inter-UE coordination information). In some aspects, the first UE may transmit the indication of the set of available resources while operating in NR sidelink resource allocation mode 2. In NR sidelink resource allocation mode 2, resource allocation is handled by UEs (e.g., in comparison to NR sidelink resource allocation mode 1, in which resource allocation is handled by a scheduling entity, such as a base station 110). In some aspects, the indication of the set of available resources may identify resources that are preferred by the first UE for transmissions by the second UE. Alternatively, the indication of the set of available resources may identify resources that are not preferred by the first UE for transmissions by the second UE (e.g., with the available resources being those other than the resources that are not preferred). Additionally, or alternatively, the inter-UE coordination signaling may indicate a resource conflict (e.g., a collision, whereby transmission and reception are scheduled in the same time resource), such as when two UEs have reserved the same resource (e.g., and were unable to detect this conflict because the two UEs transmitted a resource reservation message on the same resource and thus did not receive one another's resource reservation messages due to a half duplex constraint).

The second UE may select a sidelink resource for a transmission from the second UE based at least in part on the set of available resources indicated by the first UE. As shown, the second UE may account for the coordination information when transmitting (e.g., via a sidelink resource indicated as available by the inter-UE coordination message). Inter-UE coordination signaling related to resource allocation may reduce collisions between the first UE and the second UE and may reduce a power consumption for the first UE and/or the second UE (e.g., due to fewer retransmissions as a result of fewer collisions).

Although FIG. 6 shows a single first UE transmitting inter-UE coordination information to a single second UE, in some aspects, a single first UE may transmit inter-UE coordination information to multiple UEs to assist those UEs with selecting resources for transmissions. Additionally, or alternatively, the second UE may receive inter-UE coordination information from multiple UEs, and may use that information to select resources for a transmission (e.g., resources that avoid a conflict with all of the multiple UEs or as many as possible).

In some cases, a UE may be capable of full duplex communication. That is, the UE may be capable of transmitting and receiving at the same time. In sidelink communication, scheduling of the UE to transmit and receive at the same time may be considered a resource collision (e.g., due to a half duplex constraint), which may cause another UE (e.g., that is unaware of the full duplex communication capability of the UE) to transmit an inter-UE coordination message indicating the resource collision. However, because the UE is actually capable of performing the scheduled transmission and reception, the inter-UE coordination message indicating the resource collision is unnecessary and consumes excessive processing, memory, and/or power resources of the UE transmitting the indication as well as excessive network resources.

Some techniques and apparatuses described herein enable a UE to provide an indication that the UE, or another UE, has a full duplex communication capability. Moreover, some techniques and apparatuses described herein enable a UE to selectively transmit (e.g., transmit or refrain from transmitting) an indication of a resource collision (e.g., an inter-UE coordination message) for a simultaneous transmission and reception at another UE based at least in part on whether the other UE has a full duplex communication capability. For example, a UE may refrain from transmitting an indication of a resource collision for a simultaneous transmission and reception at another UE if the UE receives an indication that the other UE has a full duplex communication capability. By refraining from transmitting the indication, the UE may conserve processing, memory, and/or power resources as well as conserve network resources and reduce network interference.

As indicated above, FIG. 6 is provided as an example. Other examples may differ from what is described with respect to FIG. 6.

Figure 7:
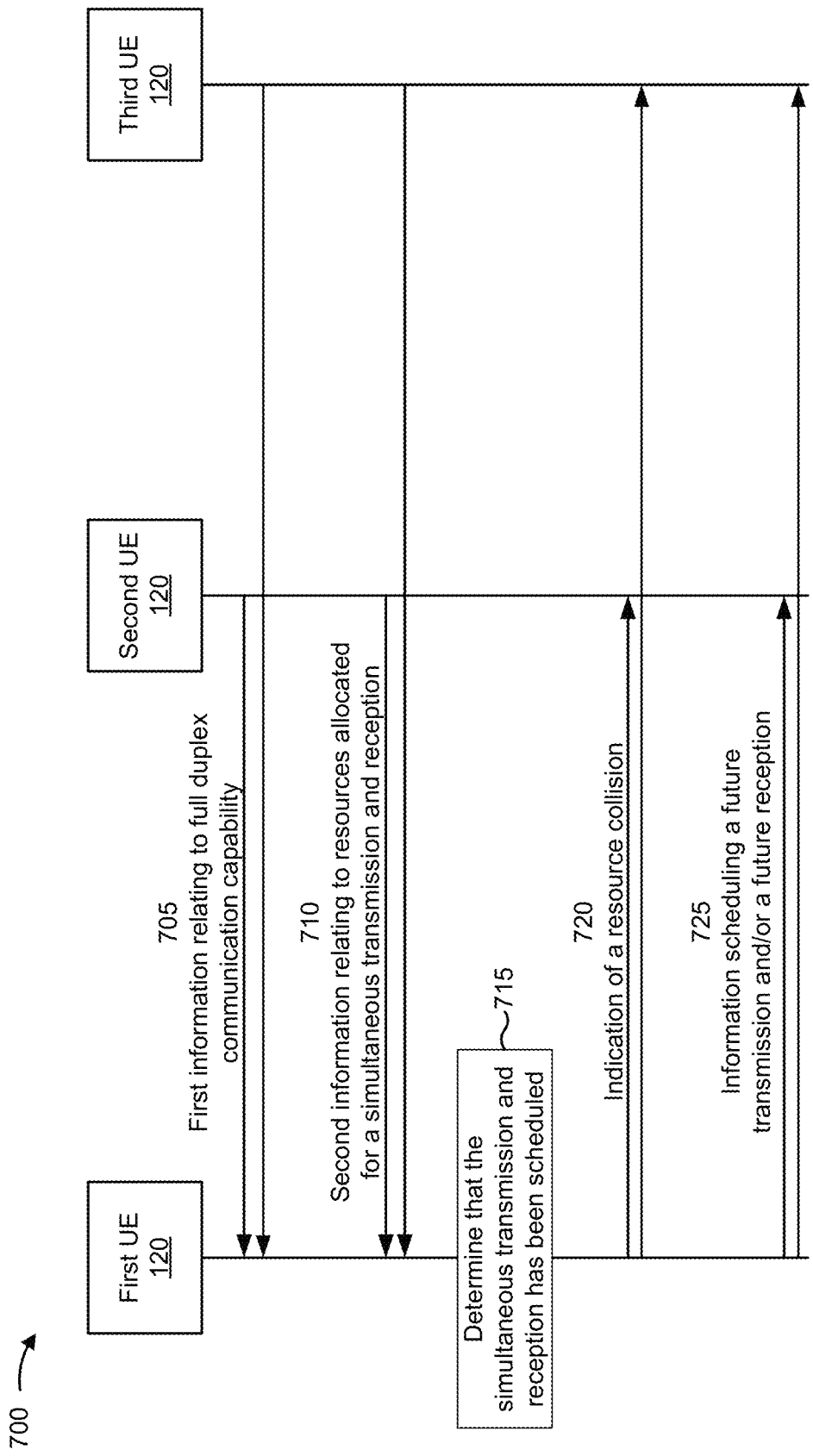
FIG. 7 is a diagram illustrating an example associated with selective resource collision indication according to full duplex communication capability, in accordance with the present disclosure.

FIG. 7 is a diagram illustrating an example 700 associated with selective resource collision indication according to full duplex communication capability, in accordance with the present disclosure. As shown in FIG. 7, multiple UEs 120 may communicate with one another (e.g., via sidelinks).

As shown by reference number 705, a first UE 120 may receive first information relating to a full duplex communication capability of a second UE 120. For example, the second UE 120 may transmit the first information to one or more neighboring UEs of the second UE 120.

In some aspects, the first UE 120 may receive the first information (e.g., from the second UE 120) via a unicast message (e.g., a dedicated message), such as in SCI, DCI, a medium access control control element (MAC-CE), and/or an RRC message. In some aspects, the first UE 120 may receive the first information (e.g., from the second UE 120) via a multicast message and/or a broadcast message, such as a master information block (MIB), a system information block (SIB), or a discovery message. For example, the multicast message and/or the broadcast message may indicate the first information in connection with an antenna panel and/or a beam (e.g., of the second UE 120) used for transmitting the message (e.g., the message may indicate that a transmitting antenna panel and/or beam is full duplex communication capable with another (non-transmitting) antenna panel and/or beam) and/or the first information in connection with an antenna panel and/or a beam (e.g., of the second UE 120) not used for transmitting the message. In some aspects, the first UE 120 may receive the first information from a node (e.g., a third UE 120) other than the second UE 120. For example, the node may detect the multicast message and/or the broadcast message indicating the first information, and the node may relay the first information to the first UE 120 (e.g., which may be attempting to transmit a resource collision indication).

In some aspects, the first information may indicate whether the second UE 120 has the full duplex communication capability. For example, the first information may indicate either that the second UE 120 has the full duplex communication capability or that the second UE 120 does not have the full duplex communication capability. Additionally, or alternatively, the first information may indicate one or more constraints on the full duplex communication capability of the second UE 120 (e.g., one or more conditions under which full duplex communication is feasible for the second UE 120).

In some aspects, the one or more constraints may include a constraint on time resources in which the second UE 120 has the full duplex communication capability. In some aspects, the one or more constraints may include a constraint on frequency resources in which the second UE 120 has the full duplex communication capability (e.g., the second UE 120 has the full duplex communication capability in FR2 but not in FR1, or the second UE 120 has the full duplex communication capability in a first band in FR2 but not in a second band in FR2). In some aspects, the one or more constraints may include a constraint on antenna panels for which the second UE 120 has the full duplex communication capability (e.g., the second UE 120 has the full duplex communication capability provided that transmission and reception are on different antenna panels, or the second UE 120 has the full duplex communication capability provided that transmission and reception are on a first antenna panel and a second antenna panel but not on the first antenna panel and a third antenna panel (e.g., due to different isolation)). In some aspects, the one or more constraints may include a constraint on beams for which the second UE 120 has the full duplex communication capability (e.g., the second UE 120 has the full duplex communication capability provided that transmission and reception are on different beams, or the second UE 120 has the full duplex communication capability provided that transmission and reception are on a first beam and a second beam but not on the first beam and a third beam (e.g., due to different isolation, even if the beams are on different antenna panels)).

As shown by reference number 710, the first UE 120 may receive second information relating to resources allocated (e.g., scheduled) for a simultaneous transmission and reception of the second UE 120. In some aspects, the first UE 120 may receive the second information from a node (e.g., the second UE 120 and/or the third UE 120) that scheduled the transmission and/or the reception of the second UE 120 (e.g., a node that scheduled the transmission and/or a node that scheduled the reception). In some aspects, the first UE 120 may receive the second information from a node that initiated and/or detected (e.g., based at least in part on monitoring SCI) the simultaneous transmission and reception of the second UE 120.

In some aspects, the second information may indicate one or more radio resources allocated for the simultaneous transmission and reception of the second UE 120. For example, the second information may indicate one or more time resources allocated for the simultaneous transmission and reception of the second UE 120. As another example, the second information may indicate one or more frequency resources allocated for the simultaneous transmission and reception of the second UE 120. In some aspects, the second information may indicate UE hardware-related resources allocated for the simultaneous transmission and reception of the second UE 120. For example, the second information may indicate one or more antenna panels allocated for the simultaneous transmission and reception of the second UE 120. As another example, the second information may indicate one or more beams allocated for the simultaneous transmission and reception of the second UE 120. In this way, the second information may enable the first UE 120 to determine whether full duplex communication is feasible for the second UE 120, as described below. As described below, in some aspects, the first information and/or the second information is not transmitted or used.

As shown by reference number 715, the first UE 120 may determine (e.g., detect) that the second UE 120 has been scheduled for the simultaneous transmission and reception (e.g., to occur in the future or which already occurred in the past). In some aspects, the first UE 120 may determine that the second UE 120 is scheduled for the simultaneous transmission and reception based at least in part on the second information; however, in some aspects, the second information is not transmitted or used. Thus, in some aspects, the first UE 120 may determine that the second UE 120 is scheduled for the simultaneous transmission and reception based at least in part on monitoring SCI (e.g., by detecting SCI scheduling simultaneous transmission and reception at the second UE 120). The simultaneous transmission and reception may include transmission in a first time period and reception in a second time period, whereby the first time period fully or partially overlaps with the second time period.

As shown by reference number 720, the first UE 120 may selectively transmit an indication of a resource collision (e.g., in inter-UE coordination signaling) for the simultaneous transmission and reception of the second UE 120. For example, as shown, the third UE 120 (e.g., that scheduled reception for the second UE 120 to occur simultaneously with a transmission for the second UE 120) may selectively receive the indication of the resource collision. As another example, the second UE 120 (e.g., that scheduled transmission for the second UE 120 to occur simultaneously with a reception for the second UE 120) may selectively receive the indication of the resource collision.

The first UE 120 may selectively transmit the indication of the resource collision based at least in part on whether the second UE 120 is capable of performing the simultaneous transmission and reception that is scheduled for the second UE 120. For example, the first UE 120 may selectively transmit the indication of the resource collision based at least in part on whether the first information and/or the second information indicates that the second UE 120 is capable of performing the simultaneous transmission and reception. However, in some aspects, the first information and/or the second information is not transmitted or used, in which case, the first UE 120 may selectively transmit the indication of the resource collision based at least in part on different information, relating to a capability of the second UE 120 for simultaneous transmission and reception, that is transmitted to, or collected by, the first UE 120.

In some aspects, to selectively transmit the indication of the resource collision, the first UE 120 may transmit the indication of the resource collision if the second UE 120 is not capable of performing the simultaneous transmission and reception (e.g., as determined by the first UE 120). For example, the first UE 120 may transmit the indication of the resource collision if the first information and/or the second information indicate that the second UE 120 is not capable of performing the simultaneous transmission and reception (e.g., in the time and/or frequency resources allocated for the simultaneous transmission and reception and/or using the antenna panels and/or the beams indicated for the simultaneous transmission and reception). However, as described above, the first information and/or the second information may not be transmitted or used, in which case the first UE 120 may transmit the indication of the resource collision if different information transmitted to, or collected by, the first UE 120 indicates that the second UE 120 is not capable of performing the simultaneous transmission and reception.

The indication of the resource collision (e.g., a half duplex resource collision) may indicate that the second UE 120 has been scheduled for transmission and reception at the same time (e.g., in fully or partially overlapping time periods). The first UE 120 may transmit the indication of the resource collision to one or more nodes that scheduled the transmission and/or the reception for the second UE 120 (e.g., the second UE 120 and/or the third UE 120). In this way, the one or more nodes may cancel the transmission and/or the reception for the second UE 120 (e.g., if the scheduled simultaneous transmission and reception is to occur in the future) and/or the one or more nodes may schedule (e.g., as soon as possible) a retransmission of the transmission and/or the reception (e.g., if the scheduled simultaneous transmission and reception has already occurred in the past). In some aspects, the first UE 120 may transmit the indication of the resource collision using dedicated resources for resource collision indications (e.g., for inter-UE coordination signaling) and/or using existing channels (e.g., SCI, PSCCH, PSFCH, or the like).

In some aspects, to selectively transmit the indication of the resource collision, the first UE 120 may refrain from transmitting the indication of the resource collision if the second UE 120 is capable of performing the simultaneous transmission and reception (e.g., as determined by the first UE 120). For example, the first UE 120 may refrain from transmitting the indication of the resource collision if the first information and/or the second information indicates that the second UE 120 is capable of performing the simultaneous transmission and reception (e.g., in the time and/or frequency resources allocated for the simultaneous transmission and reception and/or using the antenna panels and/or the beams indicated for the simultaneous transmission and reception). However, as described above, the first information and/or the second information may not be transmitted or used, in which case the first UE 120 may refrain from transmitting the indication of the resource collision if different information transmitted to, or collected by, the first UE 120 indicates that the second UE 120 is capable of performing the simultaneous transmission and reception.

In some aspects, to selectively transmit the indication of the resource collision, the first UE 120 may transmit the indication of the resource collision even if the second UE 120 is capable of performing the simultaneous transmission and reception. Here, the indication of the resource collision may further indicate that the second UE 120 is capable of performing the transmission and the reception scheduled for the second UE 120 at the same time. In some aspects, the first UE 120 may transmit the indication of the resource collision using dedicated resources and/or using existing channels, as described above.

As shown by reference number 725, the first UE 120 may transmit (e.g., to one or more other UEs) information that schedules a future transmission and/or a future reception for the second UE 120 to occur simultaneously. That is, the information may indicate scheduling of a reception for the second UE 120, which will result in simultaneous transmission and reception by the second UE 120. In some aspects, the first UE 120 (as well as one or more other UEs, such as the second UE 120 and/or the third UE 120) may transmit the information scheduling the future transmission and/or the future reception based at least in part on the first information, as described above.

Thus, for example, if the first UE 120 lacked the first information relating to the full duplex communication capability of the second UE 120, the first UE 120 may avoid scheduling a transmission to the second UE 120 in a symbol in which the second UE 120 is transmitting (e.g., according to scheduling by the second UE 120 or another UE, such as the third UE 120). However, based at least in part on the first information, the first UE 120 may schedule a transmission to the second UE 120 in a symbol in which the second UE 120 is transmitting, thereby improving the efficiency of radio resource utilization.

Moreover, the first UE 120 may transmit the information scheduling the future transmission and/or the future reception independently of the operations described in connection with reference numbers 715 and 720. In other words, information indicating a full duplex communication capability for the second UE 120 may be used by the first UE 120 to refrain from transmitting a resource collision indication (as described in connection with reference number 720) and/or may be used by the first UE 120 to schedule simultaneous transmission and reception for the second UE 120 (as described in connection with reference number 725). As described above, the first UE 120 may refrain from transmitting a resource collision indication (as described in connection with reference number 720) based at least in part on other information and without receiving or using the first information and/or the second information.

As indicated above, FIG. 7 is provided as an example. Other examples may differ from what is described with respect to FIG. 7.

Figure 8:
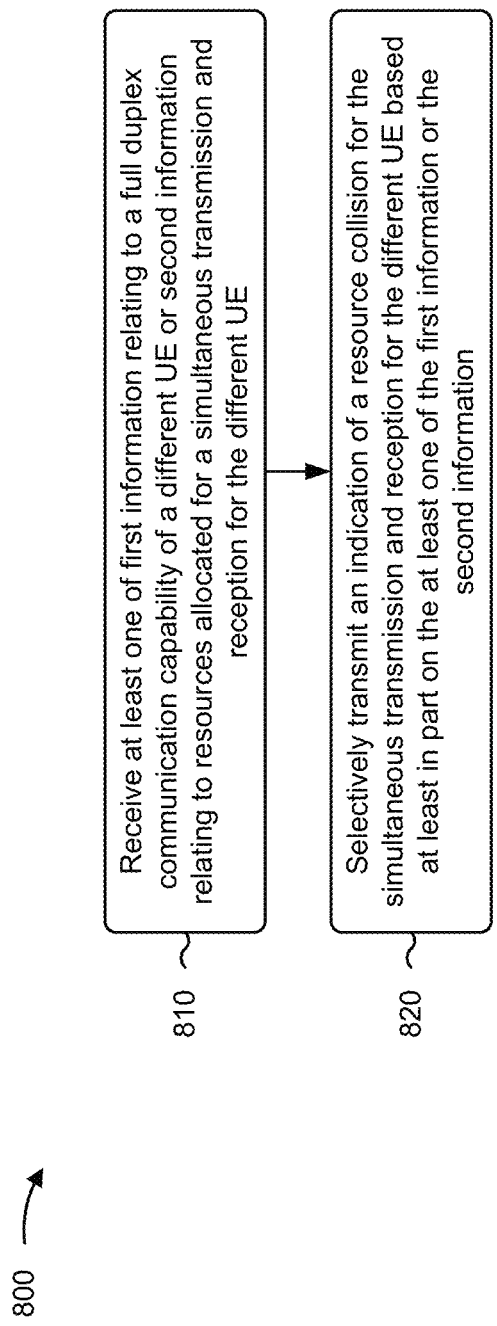
FIGS. 8-10 are diagrams illustrating example processes associated with selective resource collision indication according to full duplex communication capability, in accordance with the present disclosure.

FIG. 8 is a diagram illustrating an example process 800 performed, for example, by a UE, in accordance with the present disclosure. Example process 800 is an example where the UE (e.g., UE 120) performs operations associated with selective resource collision indication according to full duplex communication capability.

As shown in FIG. 8, in some aspects, process 800 may include receiving at least one of first information relating to a full duplex communication capability of a different UE or second information relating to resources allocated for a simultaneous transmission and reception for the different UE (block 810). For example, the UE (e.g., using communication manager 140 and/or reception component 1102, depicted in FIG. 11) may receive at least one of first information relating to a full duplex communication capability of a different UE or second information relating to resources allocated for a simultaneous transmission and reception for the different UE, as described above.

As further shown in FIG. 8, in some aspects, process 800 may include selectively transmitting an indication of a resource collision for the simultaneous transmission and reception for the different UE based at least in part on the at least one of the first information or the second information (block 820). For example, the UE (e.g., using communication manager 140 and/or transmission component 1104, depicted in FIG. 11) may selectively transmit an indication of a resource collision for the simultaneous transmission and reception for the different UE based at least in part on the at least one of the first information or the second information, as described above.

Process 800 may include additional aspects, such as any single aspect or any combination of aspects described below and/or in connection with one or more other processes described elsewhere herein.

In a first aspect, selectively transmitting the indication includes refraining from transmitting the indication if the at least one of the first information or the second information indicates that the different UE is capable of performing the simultaneous transmission and reception.

In a second aspect, alone or in combination with the first aspect, the simultaneous transmission and reception include a transmission in a first time period and a reception in a second time period, and the first time period fully or partially overlaps with the second time period.

In a third aspect, alone or in combination with one or more of the first and second aspects, the first information indicates whether the different UE has the full duplex communication capability.

In a fourth aspect, alone or in combination with one or more of the first through third aspects, the first information indicates one or more constraints on the full duplex communication capability of the different UE.

In a fifth aspect, alone or in combination with one or more of the first through fourth aspects, the one or more constraints include at least a constraint on time resources in which the different UE has the full duplex communication capability, a constraint on frequency resources in which the different UE has the full duplex communication capability, a constraint on antenna panels for which the different UE has the full duplex communication capability, a constraint on beams for which the different UE has the full duplex communication capability, or some combination thereof.

In a sixth aspect, alone or in combination with one or more of the first through fifth aspects, the first information is received from the different UE.

In a seventh aspect, alone or in combination with one or more of the first through sixth aspects, the first information is received from a node other than the different UE.

In an eighth aspect, alone or in combination with one or more of the first through seventh aspects, the first information is received via a unicast message.

In a ninth aspect, alone or in combination with one or more of the first through eighth aspects, the first information is received via a multicast message or a broadcast message.

In a tenth aspect, alone or in combination with one or more of the first through ninth aspects, the second information indicates at least one or more time resources allocated for the simultaneous transmission and reception for the different UE, one or more frequency resources allocated for the simultaneous transmission and reception for the different UE, one or more antenna panels allocated for the simultaneous transmission and reception for the different UE, one or more beams allocated for the simultaneous transmission and reception for the different UE, or some combination thereof.

In an eleventh aspect, alone or in combination with one or more of the first through tenth aspects, the second information is received from a node that scheduled at least one of a transmission or a reception, of the simultaneous transmission and reception, for the different UE.

In a twelfth aspect, alone or in combination with one or more of the first through eleventh aspects, the second information is received from a node that detected or initiated the simultaneous transmission and reception for the different UE.

Figure 11:
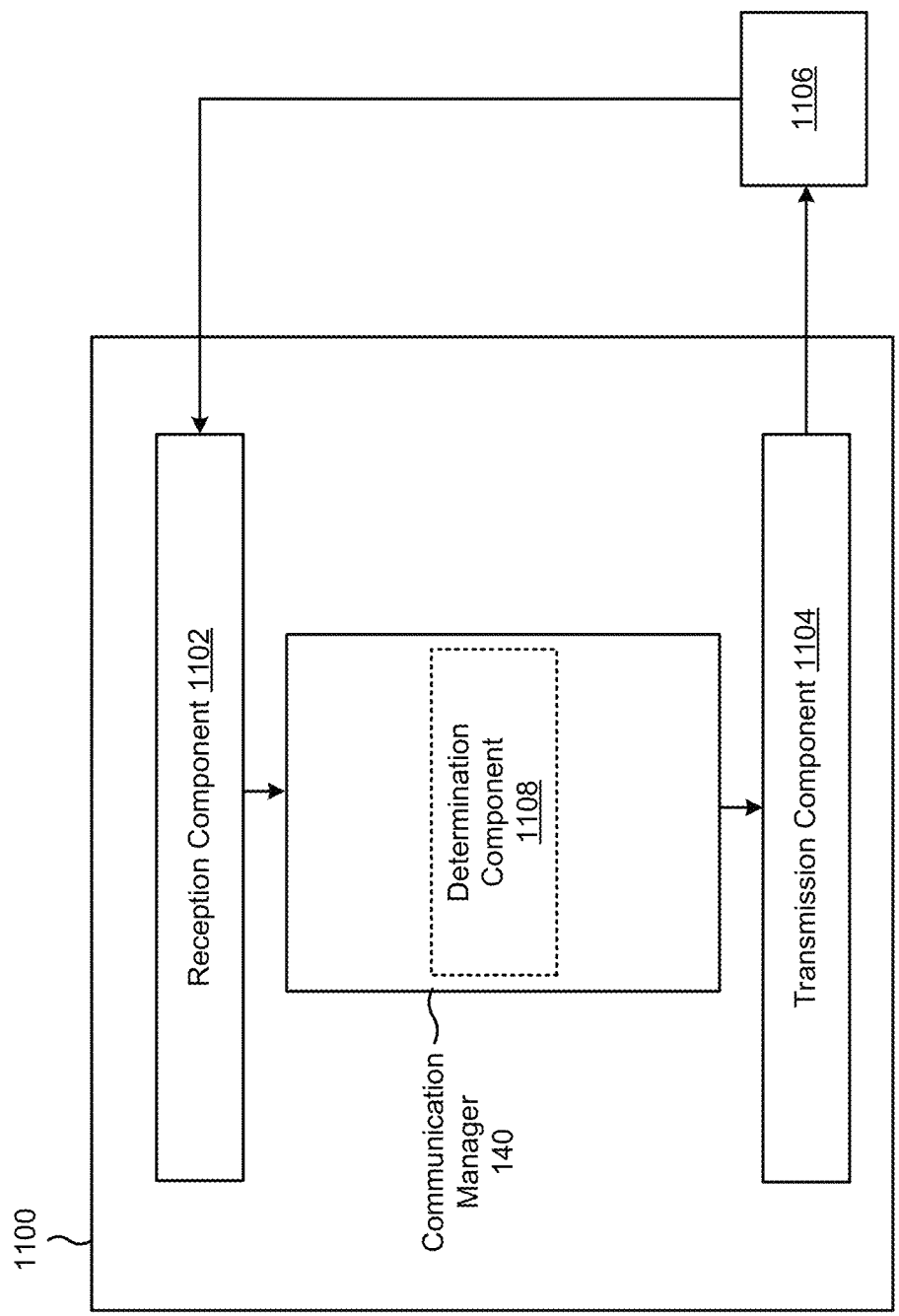
FIG. 11 is a diagram of an example apparatus for wireless communication, in accordance with the present disclosure.

In a thirteenth aspect, alone or in combination with one or more of the first through twelfth aspects, process 800 includes transmitting (e.g., using communication manager 140 and/or transmission component 1104, depicted in FIG. 11), based at least in part on the first information, information that schedules a future reception for the different UE to occur simultaneously with a future transmission for the different UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
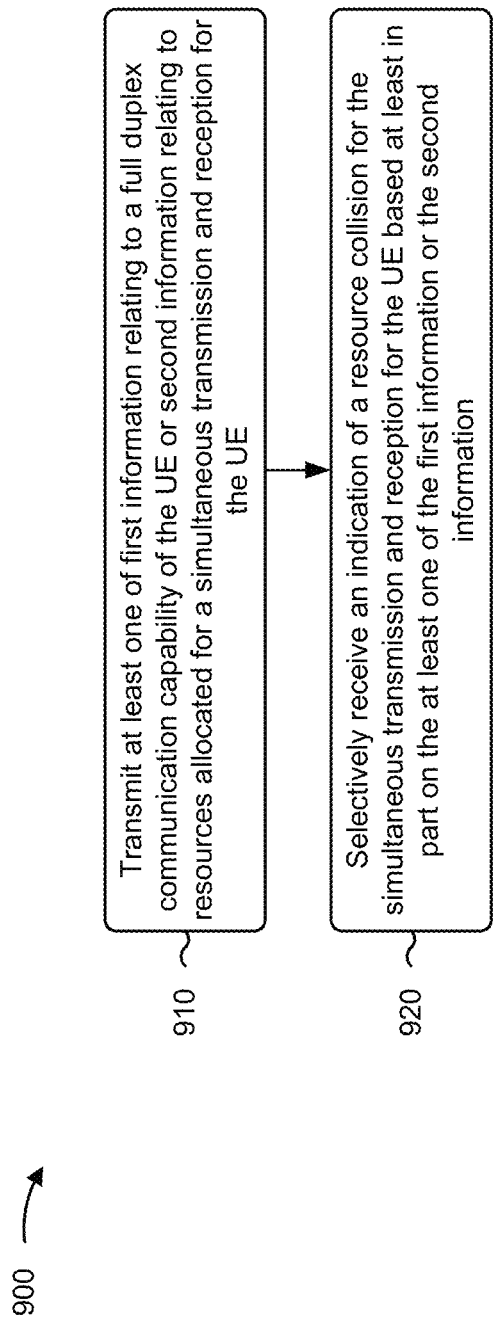

FIG. 9 is a diagram illustrating an example process 900 performed, for example, by a UE, in accordance with the present disclosure. Example process 900 is an example where the UE (e.g., UE 120) performs operations associated with selective resource collision indication according to full duplex communication capability.

As shown in FIG. 9, in some aspects, process 900 may include transmitting at least one of first information relating to a full duplex communication capability of the UE or second information relating to resources allocated for a simultaneous transmission and reception for the UE (block 910). For example, the UE (e.g., using communication manager 140 and/or transmission component 1104, depicted in FIG. 11) may transmit at least one of first information relating to a full duplex communication capability of the UE or second information relating to resources allocated for a simultaneous transmission and reception for the UE, as described above.

As further shown in FIG. 9, in some aspects, process 900 may include selectively receiving an indication of a resource collision for the simultaneous transmission and reception for the UE based at least in part on the at least one of the first information or the second information (block 920). For example, the UE (e.g., using communication manager 140 and/or reception component 1102, depicted in FIG. 11) may selectively receive an indication of a resource collision for the simultaneous transmission and reception for the UE based at least in part on the at least one of the first information or the second information, as described above.

Process 900 may include additional aspects, such as any single aspect or any combination of aspects described below and/or in connection with one or more other processes described elsewhere herein.

In a first aspect, the indication is not received if the at least one of the first information or the second information indicates that the UE is capable of performing the simultaneous transmission and reception.

In a second aspect, alone or in combination with the first aspect, the simultaneous transmission and reception include a transmission in a first time period and a reception in a second time period, and the first time period fully or partially overlaps with the second time period.

In a third aspect, alone or in combination with one or more of the first and second aspects, the first information indicates whether the UE has the full duplex communication capability.

In a fourth aspect, alone or in combination with one or more of the first through third aspects, the first information indicates one or more constraints on the full duplex communication capability of the UE.

In a fifth aspect, alone or in combination with one or more of the first through fourth aspects, the one or more constraints include at least a constraint on time resources in which the UE has the full duplex communication capability, a constraint on frequency resources in which the UE has the full duplex communication capability, a constraint on antenna panels for which the UE has the full duplex communication capability, a constraint on beams for which the UE has the full duplex communication capability, or some combination thereof.

In a sixth aspect, alone or in combination with one or more of the first through fifth aspects, the first information is transmitted via a unicast message.

In a seventh aspect, alone or in combination with one or more of the first through sixth aspects, the first information is transmitted via a multicast message or a broadcast message.

In an eighth aspect, alone or in combination with one or more of the first through seventh aspects, the second information indicates at least one or more time resources allocated for the simultaneous transmission and reception for the UE, one or more frequency resources allocated for the simultaneous transmission and reception for the UE, one or more antenna panels allocated for the simultaneous transmission and reception for the UE, one or more beams allocated for the simultaneous transmission and reception for the UE, or some combination thereof.

In a ninth aspect, alone or in combination with one or more of the first through eighth aspects, the UE scheduled a transmission, of the simultaneous transmission and reception, for the UE.

In a tenth aspect, alone or in combination with one or more of the first through ninth aspects, process 900 includes transmitting (e.g., using communication manager 140 and/or transmission component 1104, depicted in FIG. 11), based at least in part on the first information, information that schedules a future transmission for the UE to occur simultaneously with a future reception for the UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
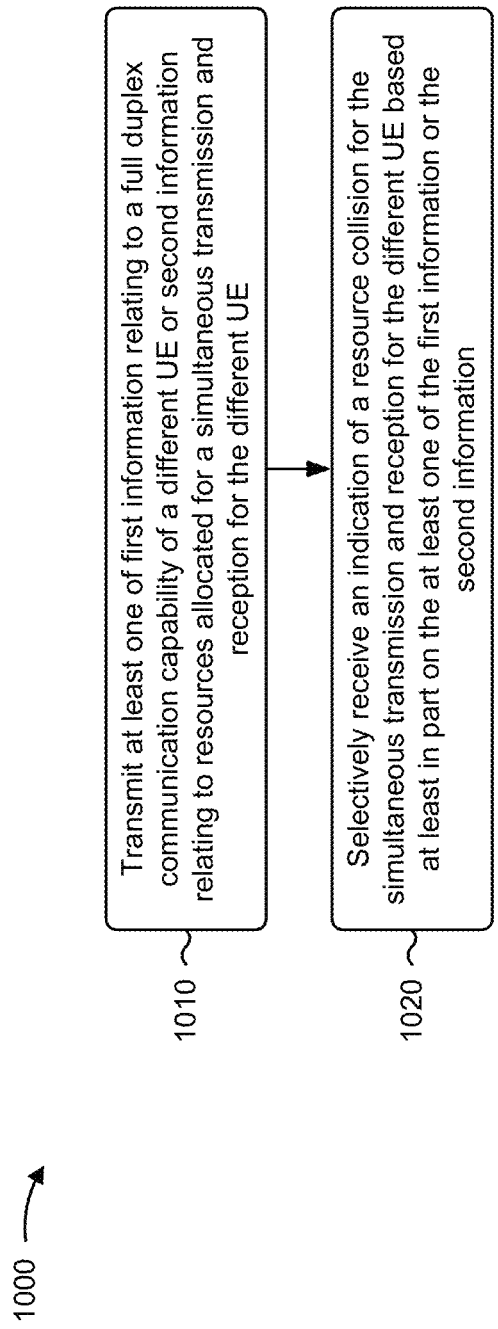

FIG. 10 is a diagram illustrating an example process 1000 performed, for example, by a UE, in accordance with the present disclosure. Example process 1000 is an example where the UE (e.g., UE 120) performs operations associated with selective resource collision indication according to full duplex communication capability.

As shown in FIG. 10, in some aspects, process 1000 may include transmitting at least one of first information relating to a full duplex communication capability of a different UE or second information relating to resources allocated for a simultaneous transmission and reception for the different UE (block 1010). For example, the UE (e.g., using communication manager 140 and/or transmission component 1104, depicted in FIG. 11) may transmit at least one of first information relating to a full duplex communication capability of a different UE or second information relating to resources allocated for a simultaneous transmission and reception for the different UE, as described above.

As further shown in FIG. 10, in some aspects, process 1000 may include selectively receiving an indication of a resource collision for the simultaneous transmission and reception for the different UE based at least in part on the at least one of the first information or the second information (block 1020). For example, the UE (e.g., using communication manager 140 and/or reception component 1102, depicted in FIG. 11) may selectively receive an indication of a resource collision for the simultaneous transmission and reception for the different UE based at least in part on the at least one of the first information or the second information, as described above.

Process 1000 may include additional aspects, such as any single aspect or any combination of aspects described below and/or in connection with one or more other processes described elsewhere herein.

In a first aspect, the indication is not received if the at least one of the first information or the second information indicates that the different UE is capable of performing the simultaneous transmission and reception.

In a second aspect, alone or in combination with the first aspect, the simultaneous transmission and reception include a transmission in a first time period and a reception in a second time period, and the first time period fully or partially overlaps with the second time period.

In a third aspect, alone or in combination with one or more of the first and second aspects, the first information indicates whether the different UE has the full duplex communication capability.

In a fourth aspect, alone or in combination with one or more of the first through third aspects, the first information indicates one or more constraints on the full duplex communication capability of the different UE.

In a fifth aspect, alone or in combination with one or more of the first through fourth aspects, the one or more constraints include at least a constraint on time resources in which the different UE has the full duplex communication capability, a constraint on frequency resources in which the different UE has the full duplex communication capability, a constraint on antenna panels for which the different UE has the full duplex communication capability, a constraint on beams for which the different UE has the full duplex communication capability, or some combination thereof.

In a sixth aspect, alone or in combination with one or more of the first through fifth aspects, the first information is transmitted via a unicast message.

In a seventh aspect, alone or in combination with one or more of the first through sixth aspects, the first information is transmitted via a multicast message or a broadcast message.

In an eighth aspect, alone or in combination with one or more of the first through seventh aspects, the second information indicates at least one or more time resources allocated for the simultaneous transmission and reception for the different UE, one or more frequency resources allocated for the simultaneous transmission and reception for the different UE, one or more antenna panels allocated for the simultaneous transmission and reception for the different UE, one or more beams allocated for the simultaneous transmission and reception for the different UE, or some combination thereof.

In a ninth aspect, alone or in combination with one or more of the first through eighth aspects, the UE scheduled a reception, of the simultaneous transmission and reception, for the different UE.

In a tenth aspect, alone or in combination with one or more of the first through ninth aspects, the UE detected or initiated the simultaneous transmission and reception for the different UE.

In an eleventh aspect, alone or in combination with one or more of the first through tenth aspects, process 1000 includes transmitting (e.g., using communication manager 140 and/or transmission component 1104, depicted in FIG. 11), based at least in part on the first information, information that schedules a future reception for the different UE to occur simultaneously with a future transmission for the different UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include a determination component 1108, among other examples.

In some aspects, the apparatus 1100 may be configured to perform one or more operations described herein in connection with FIG. 7. Additionally, or alternatively, the apparatus 1100 may be configured to perform one or more processes described herein, such as process 800 of FIG. 8, process 900 of FIG. 9, process 1000 of FIG. 10, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

In some aspects, the reception component 1102 may receive at least one of first information relating to a full duplex communication capability of a UE or second information relating to resources allocated for a simultaneous transmission and reception for the UE. The transmission component 1104 may selectively transmit an indication of a resource collision for the simultaneous transmission and reception for the UE based at least in part on the at least one of the first information or the second information. The determination component 1108 may determine that the UE is scheduled for the simultaneous transmission and reception. The transmission component 1104 may transmit, based at least in part on the first information, information that schedules a future reception for the UE to occur simultaneously with a future transmission for the UE.

In some aspects, the transmission component 1104 may transmit at least one of first information relating to a full duplex communication capability of a UE or second information relating to resources allocated for a simultaneous transmission and reception for the UE. The reception component 1102 may selectively receive an indication of a resource collision for the simultaneous transmission and reception for the UE based at least in part on the at least one of the first information or the second information. In some aspects, the transmission component 1104 may transmit, based at least in part on the first information, information that schedules a future transmission for the UE to occur simultaneously with a future reception for the UE. In some aspects, the transmission component 1104 may transmit, based at least in part on the first information, information that schedules a future reception for the UE to occur simultaneously with a future transmission for the UE.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving at least one of first information relating to a full duplex communication capability of a different UE or second information relating to resources allocated for a simultaneous transmission and reception for the different UE; and selectively transmitting an indication of a resource collision for the simultaneous transmission and reception for the different UE based at least in part on the at least one of the first information or the second information.

Aspect 2: The method of Aspect 1, wherein selectively transmitting the indication comprises: refraining from transmitting the indication if the at least one of the first information or the second information indicates that the different UE is capable of performing the simultaneous transmission and reception.

Aspect 3: The method of any of Aspects 1-2, wherein the simultaneous transmission and reception include a transmission in a first time period and a reception in a second time period, and wherein the first time period fully or partially overlaps with the second time period.

Aspect 4: The method of any of Aspects 1-3, wherein the first information indicates whether the different UE has the full duplex communication capability.

Aspect 5: The method of any of Aspects 1-4, wherein the first information indicates one or more constraints on the full duplex communication capability of the different UE.

Aspect 6: The method of Aspect 5, wherein the one or more constraints comprise at least: a constraint on time resources in which the different UE has the full duplex communication capability, a constraint on frequency resources in which the different UE has the full duplex communication capability, a constraint on antenna panels for which the different UE has the full duplex communication capability, a constraint on beams for which the different UE has the full duplex communication capability, or some combination thereof.

Aspect 7: The method of any of Aspects 1-6, wherein the first information is received from the different UE.

Aspect 8: The method of any of Aspects 1-6, wherein the first information is received from a node other than the different UE.

Aspect 9: The method of any of Aspects 1-8, wherein the first information is received via a unicast message.

Aspect 10: The method of any of Aspects 1-8, wherein the first information is received via a multicast message or a broadcast message.

Aspect 11: The method of any of Aspects 1-10, wherein the second information indicates at least: one or more time resources allocated for the simultaneous transmission and reception for the different UE, one or more frequency resources allocated for the simultaneous transmission and reception for the different UE, one or more antenna panels allocated for the simultaneous transmission and reception for the different UE, one or more beams allocated for the simultaneous transmission and reception for the different UE, or some combination thereof.

Aspect 12: The method of any of Aspects 1-11, wherein the second information is received from a node that scheduled at least one of a transmission or a reception, of the simultaneous transmission and reception, for the different UE.

Aspect 13: The method of any of Aspects 1-11, wherein the second information is received from a node that detected or initiated the simultaneous transmission and reception for the different UE.

Aspect 14: The method of any of Aspects 1-13, further comprising: transmitting, based at least in part on the first information, information that schedules a future reception for the different UE to occur simultaneously with a future transmission for the different UE.

Aspect 15: A method of wireless communication performed by a user equipment (UE), comprising: transmitting at least one of first information relating to a full duplex communication capability of the UE or second information relating to resources allocated for a simultaneous transmission and reception for the UE; and selectively receiving an indication of a resource collision for the simultaneous transmission and reception for the UE based at least in part on the at least one of the first information or the second information.

Aspect 16: The method of Aspect 15, wherein the indication is not received if the at least one of the first information or the second information indicates that the UE is capable of performing the simultaneous transmission and reception.

Aspect 17: The method of any of Aspects 15-16, wherein the simultaneous transmission and reception include a transmission in a first time period and a reception in a second time period, and wherein the first time period fully or partially overlaps with the second time period.

Aspect 18: The method of any of Aspects 15-17, wherein the first information indicates whether the UE has the full duplex communication capability.

Aspect 19: The method of any of Aspects 15-18, wherein the first information indicates one or more constraints on the full duplex communication capability of the UE.

Aspect 20: The method of Aspect 19, wherein the one or more constraints comprise at least: a constraint on time resources in which the UE has the full duplex communication capability, a constraint on frequency resources in which the UE has the full duplex communication capability, a constraint on antenna panels for which the UE has the full duplex communication capability, a constraint on beams for which the UE has the full duplex communication capability, or some combination thereof.

Aspect 21: The method of any of Aspects 15-20, wherein the first information is transmitted via a unicast message.

Aspect 22: The method of any of Aspects 15-20, wherein the first information is transmitted via a multicast message or a broadcast message.

Aspect 23: The method of any of Aspects 15-22, wherein the second information indicates at least: one or more time resources allocated for the simultaneous transmission and reception for the UE, one or more frequency resources allocated for the simultaneous transmission and reception for the UE, one or more antenna panels allocated for the simultaneous transmission and reception for the UE, one or more beams allocated for the simultaneous transmission and reception for the UE, or some combination thereof.

Aspect 24: The method of any of Aspects 15-23, wherein the UE scheduled a transmission, of the simultaneous transmission and reception, for the UE.

Aspect 25: The method of any of Aspects 15-24, further comprising: transmitting, based at least in part on the first information, information that schedules a future transmission for the UE to occur simultaneously with a future reception for the UE.

Aspect 26: A method of wireless communication performed by a user equipment (UE), comprising: transmitting at least one of first information relating to a full duplex communication capability of a different UE or second information relating to resources allocated for a simultaneous transmission and reception for the different UE; and selectively receiving an indication of a resource collision for the simultaneous transmission and reception for the different UE based at least in part on the at least one of the first information or the second information.

Aspect 27: The method of Aspect 26, wherein the indication is not received if the at least one of the first information or the second information indicates that the different UE is capable of performing the simultaneous transmission and reception.

Aspect 28: The method of any of Aspects 26-27, wherein the simultaneous transmission and reception include a transmission in a first time period and a reception in a second time period, and wherein the first time period fully or partially overlaps with the second time period.

Aspect 29: The method of any of Aspects 26-28, wherein the first information indicates whether the different UE has the full duplex communication capability.

Aspect 30: The method of any of Aspects 26-29, wherein the first information indicates one or more constraints on the full duplex communication capability of the different UE.

Aspect 31: The method of Aspect 30, wherein the one or more constraints comprise at least: a constraint on time resources in which the different UE has the full duplex communication capability, a constraint on frequency resources in which the different UE has the full duplex communication capability, a constraint on antenna panels for which the different UE has the full duplex communication capability, a constraint on beams for which the different UE has the full duplex communication capability, or some combination thereof.

Aspect 32: The method of any of Aspects 26-31, wherein the first information is transmitted via a unicast message.

Aspect 33: The method of any of Aspects 26-32, wherein the first information is transmitted via a multicast message or a broadcast message.

Aspect 34: The method of any of Aspects 26-33, wherein the second information indicates at least: one or more time resources allocated for the simultaneous transmission and reception for the different UE, one or more frequency resources allocated for the simultaneous transmission and reception for the different UE, one or more antenna panels allocated for the simultaneous transmission and reception for the different UE, one or more beams allocated for the simultaneous transmission and reception for the different UE, or some combination thereof.

Aspect 35: The method of any of Aspects 26-34, wherein the UE scheduled a reception, of the simultaneous transmission and reception, for the different UE.

Aspect 36: The method of any of Aspects 26-34, wherein the UE detected or initiated the simultaneous transmission and reception for the different UE.

Aspect 37: The method of any of Aspects 26-36, further comprising: transmitting, based at least in part on the first information, information that schedules a future reception for the different UE to occur simultaneously with a future transmission for the different UE.

Aspect 38: An apparatus for wireless communication at a device, comprising a processor; memory coupled with the processor; and instructions stored in the memory and executable by the processor to cause the apparatus to perform the method of one or more of Aspects 1-14.

Aspect 39: A device for wireless communication, comprising a memory and one or more processors coupled to the memory, the one or more processors configured to perform the method of one or more of Aspects 1-14.

Aspect 40: An apparatus for wireless communication, comprising at least one means for performing the method of one or more of Aspects 1-14.

Aspect 41: A non-transitory computer-readable medium storing code for wireless communication, the code comprising instructions executable by a processor to perform the method of one or more of Aspects 1-14.

Aspect 42: A non-transitory computer-readable medium storing a set of instructions for wireless communication, the set of instructions comprising one or more instructions that, when executed by one or more processors of a device, cause the device to perform the method of one or more of Aspects 1-14.

Aspect 43: An apparatus for wireless communication at a device, comprising a processor; memory coupled with the processor; and instructions stored in the memory and executable by the processor to cause the apparatus to perform the method of one or more of Aspects 15-25.

Aspect 44: A device for wireless communication, comprising a memory and one or more processors coupled to the memory, the one or more processors configured to perform the method of one or more of Aspects 15-25.

Aspect 45: An apparatus for wireless communication, comprising at least one means for performing the method of one or more of Aspects 15-25.

Aspect 46: A non-transitory computer-readable medium storing code for wireless communication, the code comprising instructions executable by a processor to perform the method of one or more of Aspects 15-25.

Aspect 47: A non-transitory computer-readable medium storing a set of instructions for wireless communication, the set of instructions comprising one or more instructions that, when executed by one or more processors of a device, cause the device to perform the method of one or more of Aspects 15-25.

Aspect 48: An apparatus for wireless communication at a device, comprising a processor; memory coupled with the processor; and instructions stored in the memory and executable by the processor to cause the apparatus to perform the method of one or more of Aspects 26-37.

Aspect 49: A device for wireless communication, comprising a memory and one or more processors coupled to the memory, the one or more processors configured to perform the method of one or more of Aspects 26-37.

Aspect 50: An apparatus for wireless communication, comprising at least one means for performing the method of one or more of Aspects 26-37.

Aspect 51: A non-transitory computer-readable medium storing code for wireless communication, the code comprising instructions executable by a processor to perform the method of one or more of Aspects 26-37.

Aspect 52: A non-transitory computer-readable medium storing a set of instructions for wireless communication, the set of instructions comprising one or more instructions that, when executed by one or more processors of a device, cause the device to perform the method of one or more of Aspects 26-37.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first user equipment (UE), comprising:
   one or more memories; and
   one or more processors, coupled to the one or more memories, configured to:
      receive, from a second UE, at least one of first information indicating whether the second UE has a full duplex communication capability or second information relating to resources allocated for a simultaneous transmission and reception for the second UE, wherein the simultaneous transmission and reception include a transmission in a first time period and a reception in a second time period, and wherein the first time period fully or partially overlaps with the second time period; and
      selectively transmit an indication of a resource collision for the simultaneous transmission and reception for the second UE based at least in part on the at least one of the first information or the second information,
      wherein the one or more processors, to selectively transmit the indication of the resource collision, are configured to:
         refrain from transmitting the indication of the resource collision if the at least one of the first information or the second information indicates that the second UE is capable of performing the simultaneous transmission and reception.

2. The apparatus of claim 1, wherein the one or more processors, to selectively transmit the indication of the resource collision, are configured to:
   transmit the indication of the resource collision if the at least one of the first information or the second information indicates that the second UE is not capable of performing the simultaneous transmission and reception.

3. The apparatus of claim 1, wherein the first information indicates one or more constraints on the full duplex communication capability of the second UE, and
   wherein the one or more constraints comprise at least:
      a constraint on time resources in which the second UE has the full duplex communication capability,
      a constraint on frequency resources in which the second UE has the full duplex communication capability,
      a constraint on antenna panels for which the second UE has the full duplex communication capability,
      a constraint on beams for which the second UE has the full duplex communication capability, or
      some combination thereof.

4. The apparatus of claim 1, wherein the one or more processors are further configured to:
   receive the first information from a node other than the second UE.

5. The apparatus of claim 1, wherein the second information indicates at least:
   one or more time resources allocated for the simultaneous transmission and reception for the second UE,
   one or more frequency resources allocated for the simultaneous transmission and reception for the second UE,
   one or more antenna panels allocated for the simultaneous transmission and reception for the second UE,
   one or more beams allocated for the simultaneous transmission and reception for the second UE, or
   some combination thereof.

6. The apparatus of claim 1, wherein the one or more processors are further configured to:
   receive the second information from a node that scheduled at least one of the transmission or the reception, of the simultaneous transmission and reception, for the second UE, or
   receive the second information from a node that detected or initiated the simultaneous transmission and reception for the second UE.

7. The apparatus of claim 1, wherein the one or more processors are further configured to:
   transmit, based at least in part on the first information, information that schedules a future reception for the second UE to occur simultaneously with a future transmission for the second UE.

8. The apparatus of claim 1, wherein the one or more processors, to receive the at least one of the first information or the second information, are configured to:
   receive the at least one of the first information or the second information via a unicast message.

9. The apparatus of claim 1, wherein the one or more processors, to receive the at least one of the first information or the second information, are configured to:

receive the at least one of the first information or the second information via one or more of a multicast message or a broadcast message.

10. An apparatus for wireless communication at a first user equipment (UE), comprising:
one or more memories; and
one or more processors, coupled to the one or more memories, configured to:
transmit, to a second UE, at least one of first information indicating whether the first UE has a full duplex communication capability or second information relating to resources allocated for a simultaneous transmission and reception for the first UE,
wherein the simultaneous transmission and reception include a transmission in a first time period and a reception in a second time period, and
wherein the first time period fully or partially overlaps with the second time period; and
selectively receive an indication of a resource collision for the simultaneous transmission and reception for the first UE based at least in part on the at least one of the first information or the second information,
wherein the indication of the resource collision is not received if the at least one of the first information or the second information indicates that the first UE is capable of performing the simultaneous transmission and reception.

11. The apparatus of claim 10, wherein the indication of the resource collision is received if the at least one of the first information or the second information indicates that the first UE is not capable of performing the simultaneous transmission and reception.

12. The apparatus of claim 10, wherein the first information indicates one or more constraints on the full duplex communication capability of the first UE, and
wherein the one or more constraints comprise at least:
a constraint on time resources in which the first UE has the full duplex communication capability,
a constraint on frequency resources in which the first UE has the full duplex communication capability,
a constraint on antenna panels for which the first UE has the full duplex communication capability,
a constraint on beams for which the first UE has the full duplex communication capability, or
some combination thereof.

13. The apparatus of claim 10, wherein the second information indicates at least:
one or more time resources allocated for the simultaneous transmission and reception for the UE,
one or more frequency resources allocated for the simultaneous transmission and reception for the first UE,
one or more antenna panels allocated for the simultaneous transmission and reception for the first UE,
one or more beams allocated for the simultaneous transmission and reception for the first UE, or
some combination thereof.

14. The apparatus of claim 10, wherein the one or more processors are configured to:
schedule a transmission, of the simultaneous transmission and reception, for the first UE.

15. The apparatus of claim 10, wherein the one or more processors are further configured to:
receive, based at least in part on the first information, information that schedules a future transmission for the first UE to occur simultaneously with a future reception for the first UE.

16. The apparatus of claim 10, wherein the one or more processors are further configured to:
transmit, to a third UE, at least one of the first information or the second information.

17. An apparatus for wireless communication at a first user equipment (UE), comprising:
one or more memories; and
one or more processors, coupled to the one or more memories, configured to:
transmit at least one of first information indicating whether a second UE has a full duplex communication capability or second information relating to resources allocated for a simultaneous transmission and reception for the second UE,
wherein the simultaneous transmission and reception include a transmission in a first time period and a reception in a second time period, and
wherein the first time period fully or partially overlaps with the second time period; and
selectively receive an indication of a resource collision for the simultaneous transmission and reception for the second UE based at least in part on the at least one of the first information or the second information,
wherein the indication of the resource collision is not received if the at least one of the first information or the second information indicates that the second UE is capable of performing the simultaneous transmission and reception.

18. The apparatus of claim 17, wherein the indication of the resource collision is received if the at least one of the first information or the second information indicates that the second UE is not capable of performing the simultaneous transmission and reception.

19. The apparatus of claim 17, wherein the first information indicates one or more constraints on the full duplex communication capability of the second UE, and
wherein the one or more constraints comprise at least:
a constraint on time resources in which the second UE has the full duplex communication capability,
a constraint on frequency resources in which the second UE has the full duplex communication capability,
a constraint on antenna panels for which the second UE has the full duplex communication capability,
a constraint on beams for which the second UE has the full duplex communication capability, or
some combination thereof.

20. The apparatus of claim 17, wherein the second information indicates at least:
one or more time resources allocated for the simultaneous transmission and reception for the second UE,
one or more frequency resources allocated for the simultaneous transmission and reception for the second UE,
one or more antenna panels allocated for the simultaneous transmission and reception for the second UE,
one or more beams allocated for the simultaneous transmission and reception for the second UE, or
some combination thereof.

21. The apparatus of claim 17, wherein the one or more processors are further configured to:
schedule the reception, of the simultaneous transmission and reception, for the second UE.

22. The apparatus of claim 17, wherein the one or more processors are further configured to:
transmit, based at least in part on the first information, information that schedules a future reception for the second UE to occur simultaneously with a future transmission for the second UE.

23. The apparatus of claim 17, wherein the one or more processors are further configured to:
 detect or initiate the simultaneous transmission and reception for the second UE.

24. A method of wireless communication performed by an apparatus of a first user equipment (UE), comprising:
 receiving, from a second UE, at least one of first information indicating whether the second UE has a full duplex communication capability or second information relating to resources allocated for a simultaneous transmission and reception for the second UE,
 wherein the simultaneous transmission and reception include a transmission in a first time period and a reception in a second time period, and
 wherein the first time period fully or partially overlaps with the second time period; and
 selectively transmitting an indication of a resource collision for the simultaneous transmission and reception for the second UE based at least in part on the at least one of the first information or the second information, wherein selectively transmitting the indication of the resource collision comprises:
  refraining from transmitting the indication of the resource collision if the at least one of the first information or the second information indicates that the second UE is capable of performing the simultaneous transmission and reception.

25. The method of claim 24, wherein selectively transmitting the indication of the resource collision comprises:
 transmitting the indication of the resource collision if the at least one of the first information or the second information indicates that the second UE is not capable of performing the simultaneous transmission and reception.

26. The method of claim 24, wherein the second information indicates at least:
 one or more time resources allocated for the simultaneous transmission and reception for the second UE,
 one or more frequency resources allocated for the simultaneous transmission and reception for the second UE,
 one or more antenna panels allocated for the simultaneous transmission and reception for the second UE,
 one or more beams allocated for the simultaneous transmission and reception for the second UE, or
 some combination thereof.

27. The method of claim 24, further comprising:
 transmitting, based at least in part on the first information, information that schedules a future reception for the second UE to occur simultaneously with a future transmission for the second UE.

28. The method of claim 24, further comprising:
 receiving at least one of the first information or the second information from a node other than the second UE.

29. The method of claim 24, wherein the first information indicates one or more constraints on the full duplex communication capability of the second UE, and
 wherein the one or more constraints comprise at least:
  a constraint on time resources in which the second UE has the full duplex communication capability,
  a constraint on frequency resources in which the second UE has the full duplex communication capability,
  a constraint on antenna panels for which the second UE has the full duplex communication capability,
  a constraint on beams for which the second UE has the full duplex communication capability, or
  some combination thereof.

30. The method of claim 24, further comprising:
 receiving the second information from a node that scheduled at least one of the transmission or the reception, of the simultaneous transmission and reception, for the second UE, or
 receiving the second information from a node that detected or initiated the simultaneous transmission and reception for the second UE.

* * * * *